United States Patent
Ould-Brahim et al.

(10) Patent No.: US 7,274,704 B1
(45) Date of Patent: Sep. 25, 2007

(54) PIGGYBACKING VPN INFORMATION IN BGP FOR NETWORK BASED VPN ARCHITECTURES

(75) Inventors: Hamid Ould-Brahim, Kanata (CA); Gregory V. Wright, Stittsville (CA); Bryan Gleeson, Cupertino, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 872 days.

(21) Appl. No.: 09/902,683

(22) Filed: Jul. 12, 2001

Related U.S. Application Data

(60) Provisional application No. 60/218,251, filed on Jul. 14, 2000.

(51) Int. Cl.
 *G06F 15/173* (2006.01)
 *H04K 1/00* (2006.01)
 *H04L 12/28* (2006.01)
 *H04J 3/16* (2006.01)

(52) U.S. Cl. ............... 370/409; 713/182; 370/254; 370/257; 370/389; 370/351; 370/465; 709/238

(58) Field of Classification Search ............... 713/182, 713/200; 370/7, 351, 501, 409, 379.1, 257, 370/255; 709/238
See application file for complete search history.

(56) References Cited

U.S. PATENT DOCUMENTS

| 6,526,056 B1 * | 2/2003 | Rekhter et al. | 370/392 |
| 6,813,644 B1 * | 11/2004 | Jamieson et al. | 709/242 |
| 2003/0016672 A1 * | 1/2003 | Rosen et al. | 370/392 |

OTHER PUBLICATIONS

Rosen, E., et al., "BGP/MPLS VPNs", IETF RFC 2547, Mar. 1999.*
Fox, B., et al., "Virtual Private Networks Identifier", IETF RFC 2685, Sep. 1999.*
Bates, T., et al., "Multiprotocol Extensions for BGP-4", IETF RFC 2283, Feb. 1998.*
Rosen, E., et al., "BGP/MPLS VPNs", IETF RFC 2547, Mar. 1999.*
Fox, B., et al., "Virtual Private Networks Identifier", IETF RFC 2685, Sep. 1999☐☐.*
Bates, T., et al., "Multiprotocol Extensions for BGP-4", IETF RFC 2283, Feb. 1998.*
Rekhter, Y., and Li, T., "A Border Gateway Protocol 4 (BGP-4)", IETF RFC1771, T. J. Watson Research Center, Cisco, Mar. 1995.
Bates, T. et al., "Multiprotocol Extensions for BGP-4", IETF RFC2283, Cisco Systems, Juniper Networks, Feb. 1998.
Rosen, E., et al., BGP/MPLS VPNs, IETF Internet-Draft update of RFC2547, May 2000.
Ould-Brahim, H., et al., "Network based IP VPN Architecture using Virtual Routers", IETF Internet-Draft, Mar. 2001.
Fox, B., et al., "Virtual Private Networks Identifier", IETF RFC2685, Sep. 1999.

* cited by examiner

*Primary Examiner*—Ayaz Sheikh
*Assistant Examiner*—Kaveh Abrishamkar

(57) ABSTRACT

A common BGP framework is provided to achieve VPN information discovery in network based VPNs using modifications to existing BGP-4 multiprotocol extension path attributes. The framework allow each VPN to implement different OSI layer-2 or layer-3 protocols, and to implement different OSI layer-2 or layer-3 protocols from those used by the backbone of the shared network. The extensions added to BGP-4 apply both to Virtual Router (VR) models of VPN systems and to non-VR models.

22 Claims, 5 Drawing Sheets

| | |
|---|---|
| 100 | LENGTH OF NLRI (2 OCTETS) |
| 105 | NUMBER OF VPN-IDS (2 OCTETS) |
| 110 | FIRST VPN-ID (7 OCTETS) |
| 110 | --- |
| 110 | FINAL VPN-ID (7 OCTETS) |
| 115 | VPN TOPOLOGY ATTRIBUTE (2 OCTETS) |
| 120 | VPN REACHABILITY MODE (1 OCTET) |
| 125 | LENGTH OF VPN REACHABILITY ENTRIES (2 OCTETS) |
| 130 | FIRST VPN REACHABILITY ENTRY (VARIABLE) |
| 130 | --- |
| 130 | FINAL VPN REACHABILITY ENTRY (VARIABLE) |
| 135 | LENGTH OF VPN TUNNEL ENTRIES (2 OCTETS) |
| 140 | FIRST VPN TUNNEL ENTRY (VARIABLE) |
| 140 | --- |
| 140 | FINAL VPN TUNNEL ENTRY (VARIABLE) |
| 145 | OTHER VPN INFORMATION (VARIABLE) |

FIG. 3A

PIGGYBACKING VPN INFORMATION IN BGP FOR NETWORK BASED VPN ARCHITECTURES

This application claims the benefit of U.S. Provisional Application No. 60/218,251, filed Jul. 14, 2000.

FIELD OF THE INVENTION

This invention relates to communication systems implementing network based virtual private networks, and more particularly to distribution within such systems of information relating to the virtual private networks.

BACKGROUND OF THE INVENTION

In communication systems consisting of multiple Autonomous Systems (ASs), a routing protocol is required whereby the ASs can share information about sites and hosts that can be reached within each ASs. A common routing protocol, and the routing protocol used in the Internet for Internet Protocol version 4 (IPv4) traffic, is the Border Gateway Protocol version 4 (BGP-4). BGP-4 is defined in Rekhter, Y., and Li, T., "A Border Gateway Protocol 4 (BGP-4)", IETF RFC1771, T. J. Watson Research Center, cisco, March 1995, incorporated by reference herein. BGP-4 allows Border Gateway Protocol Speakers (BGP Speakers) to automatically and periodically exchange Network Layer Reachability Information (NLRI). NLRI is sent as part of an Update message between border gateways. Each Update message may advertise one feasible route. A feasible route includes a NLRI field, composed of a list of Internet Protocol (IP) addresses which are destinations of the route, and zero or more Path Attributes, which each include an Attribute Flag, an Attribute Type Code and an Attribute Value. BGP-4 defines several Attribute Type Codes, but allows new Attribute Type Codes to be defined. Using NLRI collected over time from Update messages, each BGP Speaker builds routing databases whereby a route to a destination within the communication system can be determined.

Due to the definition of some Attribute Value fields within BGP-4, BGP-4 is capable of carrying routing information only for IPv4 traffic. However some communication systems implement different networking systems. For example, different Open System Interconnect (OSI) layer-2 or layer-3 protocols may be used within the communication system. One solution is proposed in Bates, T., Chandra, R., Katz, D., and Rekhter, Y., "Multiprotocol Extensions for BGP-4", IETF RFC2283, Cisco Systems, Juniper Networks, February 1998, incorporated by reference herein, in which extensions to BGP-4 are defined. The resulting BGP Multiprotocol Extensions (BGP-MP) enable BGP-4 to distribute routing information for multiple network layer protocols. BGP-MP introduces two new Path Attributes. The first new Path Attribute, Multiprotocol Reachable NLRI (MP_REACH_NLRI), carries a set of destinations reachable through the BGP Speaker which sent the Update message, together with next hop information. The new Attribute Type Code of MP_REACH_NLRI is defined to have a value of "14". MP_REACH_NLRI is defined as an optional Path Attribute using the Attribute Flag (to allow for backward compatibility). The Attribute Value of MP_REACH_NLRI consists of several fields. The first field in the Attribute Value is an Address Family Identifier field, which identifies the network layer protocol associated with the destinations identified in an NLRI field. The second field in the Attribute Value is a Subsequent Address Family Identifier (SAFI) field, which provides additional information about the type of NLRI carried in the Path Attribute. The second new Path Attribute, Multiprotocol Unreachable NLRI (MP_UNREACH_NLRI) carries a set of routes which are to be withdrawn from the routing database of the BGP Speaker which receives the Update message. The new Attribute Type Code of MP_UNREACH_NLRI is defined to have a value of "15". Like MP_REACH_NLRI, MP_UNREACH_NLRI is defined as an optional Path Attribute, and its Attribute Value includes an Address Family Identifier field and a SAFI field. In summary, when a BGP Speaker receives an Update message having an Attribute Type Code of "14" or "15", the BGP Speaker realizes that the destinations listed in the NLRI field are associated with the network layer protocol identified by the Address Family Identifier field.

Network based Virtual Private Networks (VPNs) are emulations of private wide area networks using public or other party backbone facilities. Network based VPNs allow a business to run a wide area network over a large geographic area without having to purchase and manage its own backbone, thereby saving costs. For example, a business may own computers at two geographically separate sites, and wish to connect them as a network. Network based VPNs provide a means for the business to link the two sites using the backbone facilities of someone else (referred to as a provider). Network based VPNs can be implemented using either a piggybacking model (Rosen, E., et al., "BGP/MPLS VPNs", IETF Internet-Draft update of RFC2547, May 2000, incorporated by reference herein, provides an example of a piggybacking model) or a Virtual Router model (see, for example, Ould-Brahim, H., et al., "Network based IP VPNs using Virtual Routers", IETF Internet-Draft, July 2000, incorporated by reference herein). Current methods for implementing network based VPNs in either model require the same networking system to be used in each VPN as is used in the backbone. However, when purchasing VPN services from a provider a business with an existing private network may not wish to alter its networking system in order to comply with the networking system used by the backbone and the other VPNS. There is a need for a VPN information distribution scheme which allows different networking systems to be used by each VPN and by the backbone.

SUMMARY OF THE INVENTION

The present invention provides a Border Gateway Protocol Speaker (BGP Speaker) in a communication system which implements at least one network based Virtual Private Network (NB-VPN) across a backbone. Each NB-VPN uses an Open System Interconnect (OSI) layer-2 protocol and an OSI layer-3 protocol, and at least one NB-VPN uses an OSI layer-2 protocol different from an OSI layer-2 protocol used by the backbone or uses an OSI layer-3 protocol different from an OSI layer-3 protocol used by the backbone. The BGP Speaker transmits an Update message in conformance with a Border Gateway Protocol (BGP), and the Update message further includes, Virtual Private Network (VPN) Membership information, VPN Reachability information, and Tunnel Mechanism information. The Update message further includes a field indicating a topology of the NB-VPN and a field indicating a VPN Reachability Mode. In addition to the BGP Speaker, the invention provides the data format itself.

The VPN Membership information includes at least one VPN Identification (VPN-ID) field and a Number of VPN-IDs field. The VPN Reachability information includes zero or more VPN Reachability Entries. Each VPN Reachability Entry includes a VPN Reachability Type field, a Length field, and a VPN Reachability Value field. The Tunnel Mechanism information includes zero or more VPN Tunnel Entries, each VPN Tunnel Entry including a Tunnel Type field, a Length field and a Tunnel Value field.

The Update message includes a unique Subsequent Address Family Identifier (SAFI) value indicating that the Update message includes the information relating to the NB-VPNs and the information relating to networking systems used by the NB-VPNs. A SAFI value of "129" is proposed.

The invention also provides a Virtual Router receiving an Update message being in conformance with a Border Gateway Protocol (BGP) and further including information relating to a NB-VPN to which the VR belongs and information relating to networking systems used by the NB-VPN to which the VR belongs, and the VR including instructions for establishing an OSI layer-2 connection to at least one other VR in the NB-VPN.

The method allows VPN routing information to be distributed within a communication system employing multiple OSI layer-2 or layer-3 protocols. In addition, a VR can discover OSI layer-2 information and establish a layer-2 link with another VR, thereby avoiding the need to establish a layer-3 link through the backbone.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which:

FIG. 3a is a chart of a format of Network Layer Reachability Information (NLRI);

DETAILED DESCRIPTION OF THE PREFERRED EMBODIMENTS

Figure 1:
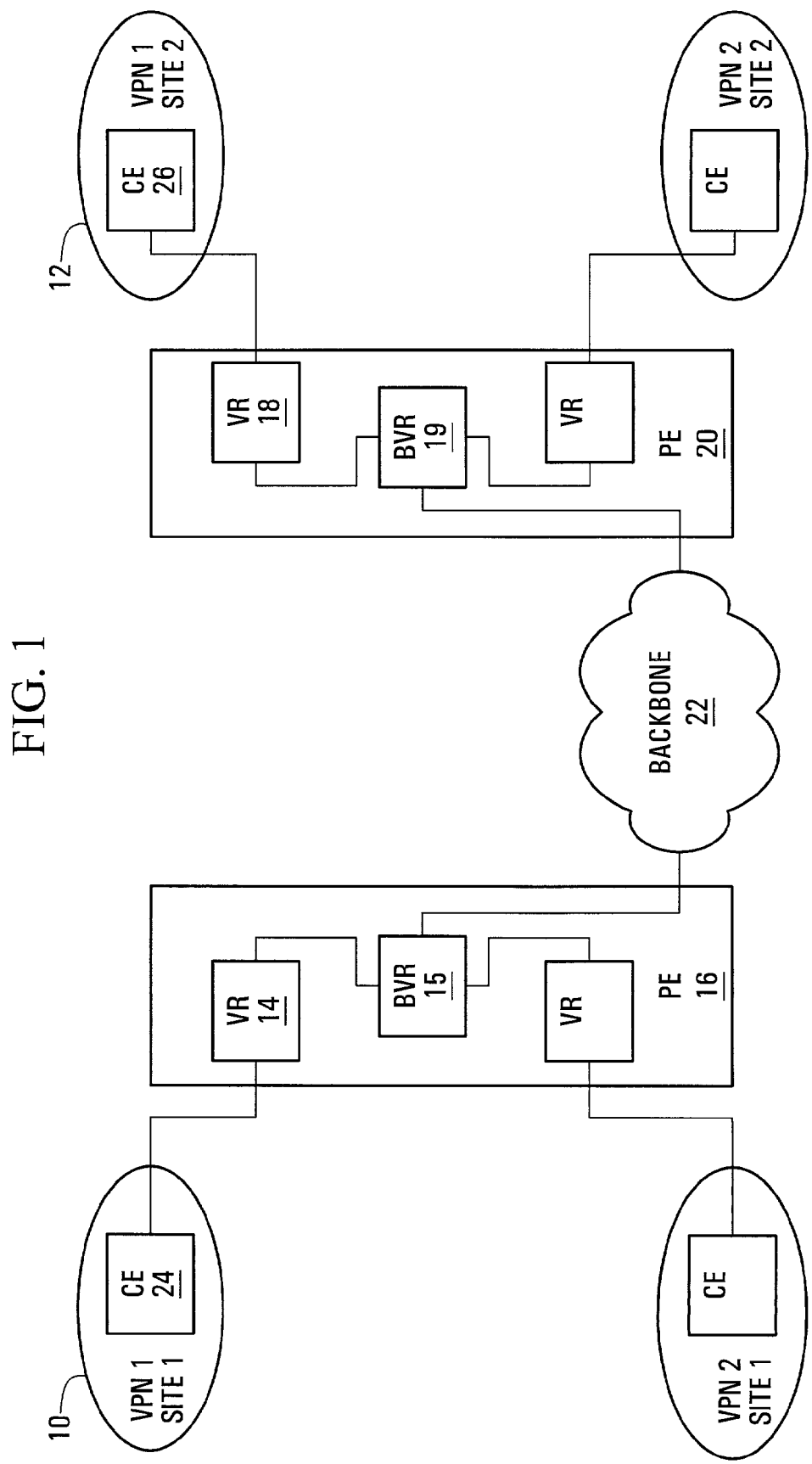
FIG. 1 is a block diagram of a network based Virtual Private Network (VPN) using a virtual router model.

Referring to FIG. 1, a network based Virtual Private Network (VPN) implemented using a Virtual Router (VR) model within a communication system is shown. Two private networks, a first private network being located at a first site 10 and a second private network being located at a second site 12, are operated by a customer who wishes to establish a VPN to connect both private networks. Hosts at the first site 10 are connected, either directly or indirectly via other hosts within the first site, to a first Customer Edge (CE) device 24. A CE device may be a router, a switch, or, if the private network to which the CE device belongs is a single host, a host. Hosts at the second site 12 are connected, either directly or indirectly, to a second CE device 26. The first CE device 24 is connected to a first VR 14 over an access link, and the second CE device 26 is connected to a second VR 18 over another access link. The first VR 14 is located within a first Provider Edge (PE) device 16 and is connected to a first Backbone Virtual Router (BVR) 15, also within the first PE device 16. A PE device may be a router or a switch. The second VR 18 is located within a second PE device 20 and is connected to a second BVR 19, also within the second PE device 20. Both VRs maintain routing tables which define a reachability for the VPN. The BVRs 15 and 19 are connected to a backbone 22, which is not aware of the VPN. The backbone 22 is generally a shared network infrastructure. Neither the backbone 22 nor the PE devices 16 and 20 are operated by the customer. If a Border Gateway Protocol (BGP) is used by the BVRs to advertise routes and to allow the routing tables of the VRs to be populated, then each BVR is a BGP Speaker, in that each BVR transmits Update messages in accordance with BGP.

More than one VPN may be present within the communication system, in which case any PE device may contain more than one VR, each VR maintaining routing tables for the VPN to which it is connected, and each VR within a PE device being connected to the BVR in the PE device. Two VPNs (VPN1 and VPN2) are shown in FIG. 1. If there is more than one VPN, then there may be more than one backbone. All VRs belonging to the same VPN must have an identical VPN Identification (VPN-ID) unique to the VPN, an example format of which is defined in Fox, B. et al, "Virtual Private Networks Identifier", IETF RFC2685, September 1999 (RFC2685), incorporated by reference herein.

Figure 2:
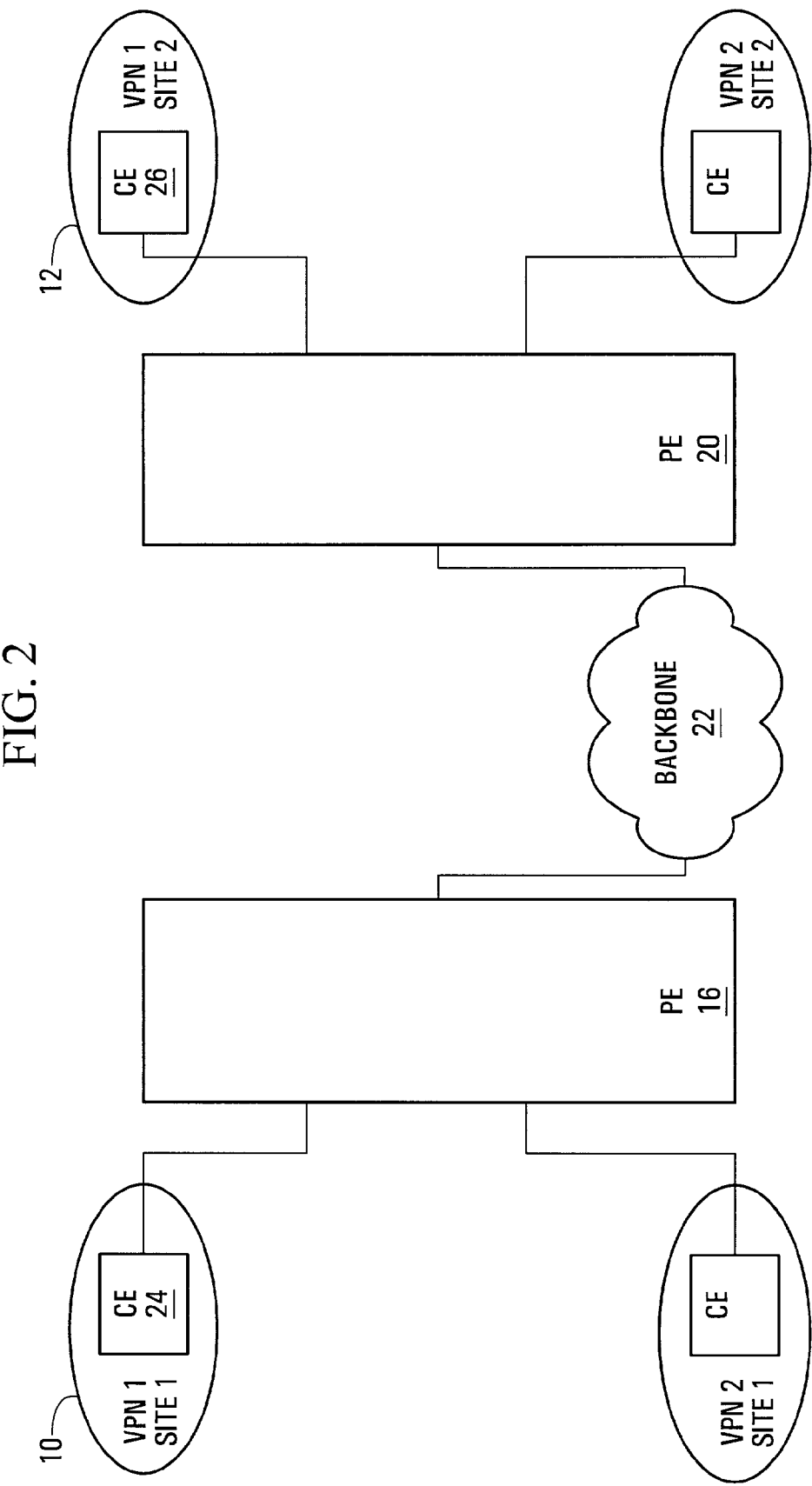
FIG. 2 is a block diagram of a network based VPN using a piggybacking model.

A network based Virtual Private Network (VPN) can also be implemented using a piggybacking model within a communication system, as shown in FIG. 2. Unlike the VR model, VRs are not used. Rather, the first CE device 24 is connected to the first PE device 16 over an access link, and the second CE device 26 is connected to the second PE device 20 over another access link. Each PE device is connected to the backbone 22. Each PE device maintains routing tables which define a reachability for each VPN in each site to which the PE device is connected. Each PE devices is a BGP Speaker, in that each PE device transmits Update messages in accordance with BGP.

The backbone and each VPN employ Open System Interconnect (OSI) layer-2 protocols and OSI layer-3 protocols. The communication system is a multiservice system in that the VPNs need not employ the same OSI layer-2 protocol as that used by the backbone, and need not employ the same OSI layer-3 protocol as that used by the backbone. Furthermore, a VPN need not use the same OSI layer-2 or OSI layer-3 protocol as is used by other VPNs in the communication system.

Figure 3B:
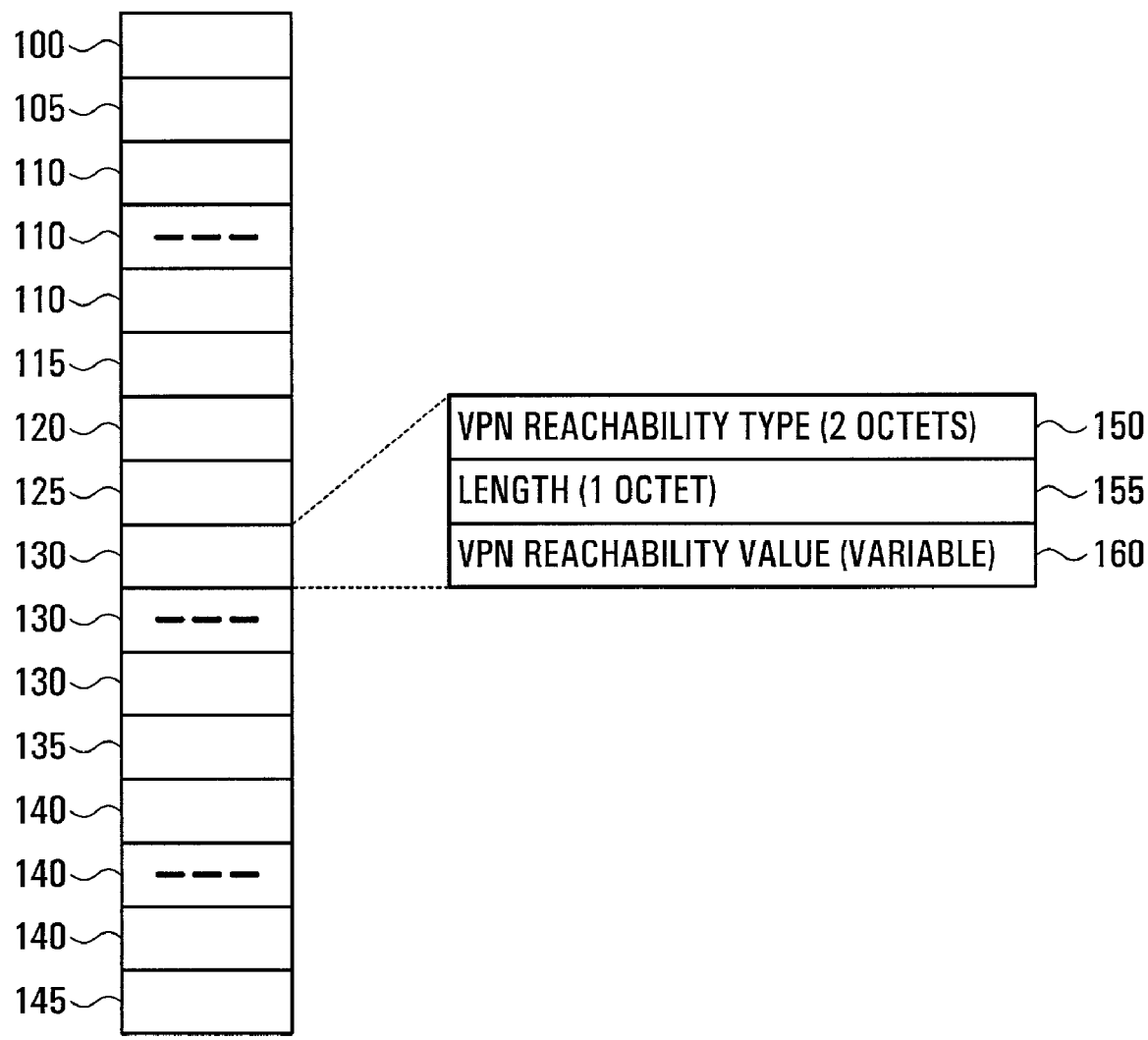
FIG. 3b is a chart of a format of a VPN Reachability Entry within the NLRI.
Figure 3C:
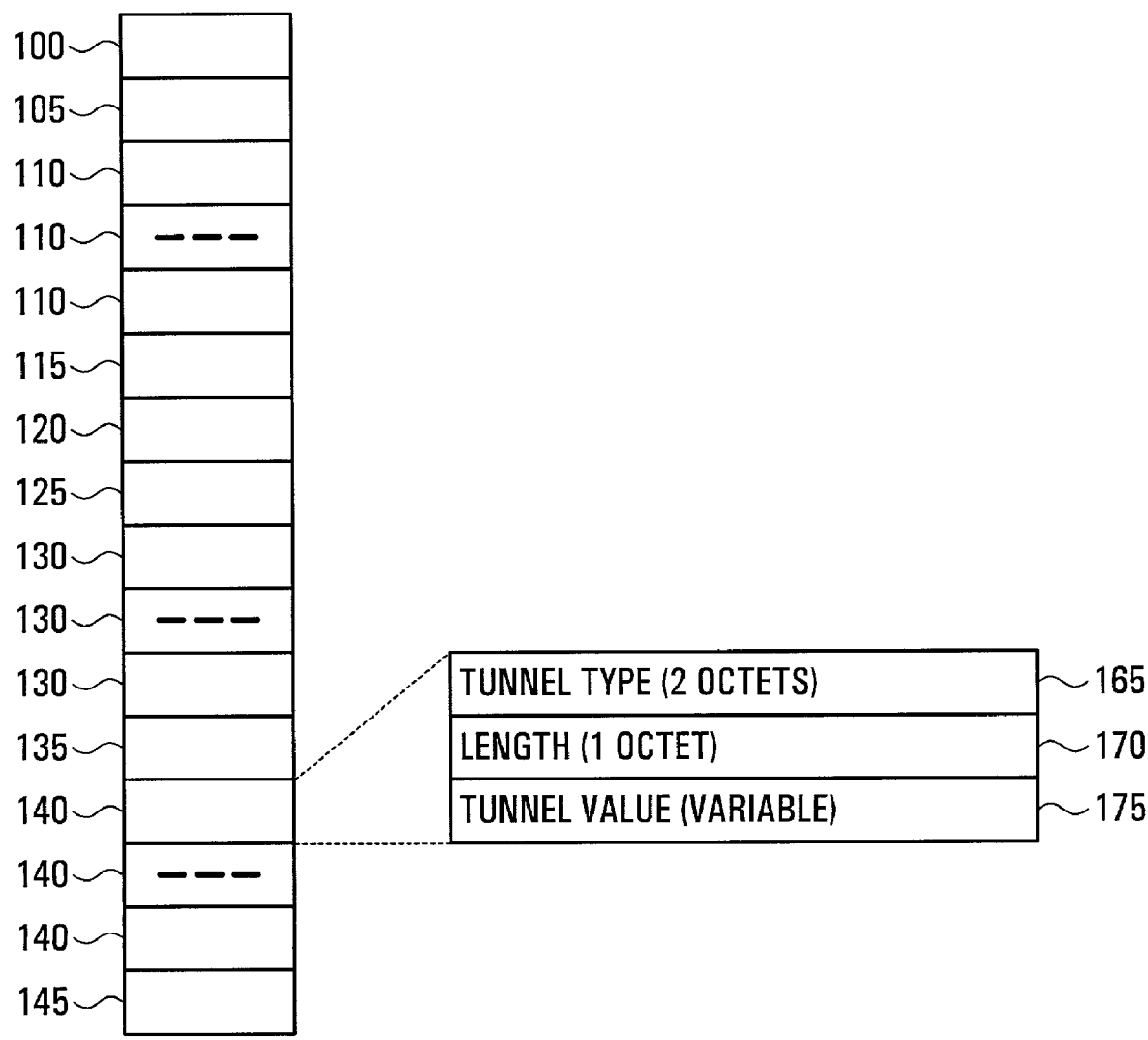
FIG. 3c is a chart of a format of a VPN Tunnel Entry within the NLRI.

BGP Speakers periodically transmit Update messages to each other using a Multiprotocol Extension to the Border Gateway Protocol (BGP-MP). An Update message may include a Multiprotocol Reachability NLRI (MP_REACH_NLRI) Path Attribute having an Attribute Type Code of "14". A MP_REACH_NLRI is used by the BGP Speaker that transmits the Update message to advertise a feasible route to destinations listed in the NLRI. The routing tables maintained by the BGP Speaker which receives the Update message may be updated to include the feasible route. An Update message may also include a Multiprotocol Unreachability NLRI (MP_UNREACH_NLRI) Path Attribute having an Attribute Type Code of "15". A MP_UNREACH_NLRI is used by the BGP Speaker that transmits the Update message to advertise routes which are no longer feasible, and which should be removed from the routing tables maintained by the BGP Speaker which receives the Update message. Both of the MP_REACH_NLRI and MP_UNREACH_NLRI Path Attributes may include a set of Network Layer Reachability Information (NLRI) fields, each NLRI field listing one or more destination addresses of a route. Both of these Path Attributes include an Address Family Identifier field, which identifies a network layer protocol associated with the destination addresses listed in the NLRI field. Both of these Path Attributes also include a Subsequent Address Family Identifier (SAFI) field, which provides additional information about the destination addresses listed in the NLRI field. A unique value for the SAFI field of both MP_REACH_NLRI and MP_UNREACH_NLRI is used to indicate that the NLRI fields contain VPN information. A value of "129" may be used as the unique value for the SAFI field, as the value of "129" is not currently in use and is not a reserved value. The VPN information contained in each NLRI field produced by a BGP Speaker is shown in FIGS. 3a to 3c.

Referring first to FIG. 3a, a NLRI field includes a Length of NLRI field 100, which indicates a length of the NLRI field in bits and is two octets in length. A NLRI field includes VPN Membership Information. VPN Membership Information includes a Number of VPN-Identifications (VPN-IDs) field 105 and at least one VPN-ID field 110. The Number of VPN-IDs field 105 indicates the number of VPN-ID fields in the NLRI, and is two octets in length. Each VPN-ID field identifies a VPN to which the NLRI relates, and is preferably in conformance with the format specified by RFC2685. A NLRI field also includes a VPN Topology Attribute field 115, which is used to indicate a VPN topology and is two octets in length.

A NLRI field also includes VPN Reachability Information which defines routes by which the VPNs to which the NLRI relates can be reached. The VPN Reachability Information includes a Length of VPN Reachability Entries field 125, and zero or more VPN Reachability Entries 130. The Length of VPN Reachability Entries field 125 indicates a total length of the VPN Reachability Entry fields 130 in bits, and is two octets in length. Each VPN Reachability Entry field 130 has a format as shown in FIG. 3b, and includes a VPN Reachability Type field 150, a Length field 155, and a VPN Reachability Value field 160. The VPN Reachability Type field 150 indicates a type of VPN route, and is two octets in length. The Length field 155 indicates a length of the VPN Reachability Value field 160 in bits, and is one octet in length. The VPN Reachability Value field 160 contains a VPN route, along with any information relevant to the VPN route, and has a variable length.

A NLRI field also includes Tunnel Mechanism information. A tunnel allows opaque transport of VPN packets across the backbone, such that packet forwarding within the backbone is independent of VPN address fields within the packet. The Tunnel Mechanism information includes a Length of VPN Tunnel Entries field 135 and zero or more VPN Tunnel Entry fields 140. The Length of VPN Tunnel Entries field 135 indicates a total length of the VPN Tunnel Entry fields 140 in bits, and is two octets in length. Each VPN Tunnel Entry field has a format as shown in FIG. 3c, and includes a Tunnel Type field 165, a Length field 170, and a Tunnel Value field 175. The Tunnel Type field 165 indicates a type of tunneling mechanism, and is two octets in length. The Length field 170 indicates a length of the Tunnel Value field in bits, and is one octet in length. The Tunnel Value field 175 carries information related to an endpoint of the tunnel, and has a variable length. The Tunnel Value field 175 can carry, for example, address information, Quality of Service information, and tunnel mechanism parameters.

A NLRI field also includes a VPN Reachability Mode field 120. The VPN Reachability Mode field 120 indicates whether a piggybacking model or a VR model is being used by the VPNs to which the NLRI relates, and is one octet in length. A NLRI field may also include an Other VPN Information field 145 for passing various VPN information. The Other VPN Information field 145 may carry vendor specific information, for example Quality of Service parameters or passwords. The Other VPN Information field 145 is optional in a NLRI field.

A network based VPN implemented using a VR architecture may also use the VPN information depicted in FIGS. 3a to 3c to establish Open System Interconnect (OSI) layer-2 links between VRs. This removes the necessity of a layer-3 link within the backbone, providing additional security for traffic flowing between the VRs.

What has been described is merely illustrative of the application of the principles of the invention. Other arrangements and methods can be implemented by those skilled in the art without departing from the spirit and scope of the present invention. For example, the various field lengths and field values that have been described are proposed for use as a standard protocol. Different field lengths and different field values may be varied without departing from the scope of the invention. Formats other than that specified in RFC2685 can be used to describe the VPN-ID fields 110.

We claim:

1. A Border Gateway Protocol Speaker (BGP Speaker) in a communication system which implements at least one network based Virtual Private Network (NB-VPN) across a backbone, the at least one NB-VPN using an Open System Interconnect (OSI) layer-2 protocol and an OSI layer-3 protocol, one or more of the at least one NB-VPN using an OSI layer-2 protocol different from an OSI layer-2 protocol used by the backbone or using an OSI layer-3 protocol different from an OSI layer-3 protocol used by the backbone, the BGP Speaker operable to:

transmit an Update message being in conformance with a Border Gateway Protocol (BGP), the Update message further including:

Virtual Private Network (VPN) Membership information that indicates an identification of at least one VPN to which the Update message relates;

a VPN Reachability Mode field that indicates a type of VPN model being used by the at least one VPN;

VPN Reachability information that indicates at least one route by which the at least one VPN can be reached; and Tunnel Mechanism information that indicates characteristics of a tunnel used to transport VPN packets across the backbone.

2. The BGP Speaker of claim 1 wherein the VPN Membership information includes:

at least one VPN Identification (VPN-ID) field; and a Number of VPN-IDs field.

3. The BGP Speaker of claim 1 wherein the VPN Reachability information includes zero or more VPN Reachability Entries.

4. The BGP Speaker of claim 3 wherein a VPN Reachability Entry includes:

a VPN Reachability Type field;

a Length field; and a VPN Reachability Value field.

5. The BGP Speaker of claim 1 wherein the Tunnel Mechanism information includes zero or more VPN Tunnel Entries.

6. The BGP Speaker of claim 5 wherein a VPN Tunnel Entry includes:
- a Tunnel Type field;
- a Length field; and
- a Tunnel Value field.

7. The BGP Speaker of claim 1 wherein the Update message includes a unique Subsequent Address Family Identifier (SAFI) value indicating that the Update message includes:
- Virtual Private Network (VPN) Membership information;
- VPN Reachability information; and
- Tunnel Mechanism information.

8. The BGP Speaker of claim 7 wherein the unique SAFI value is 129.

9. The BGP Speaker of claim 1 wherein the Update message further includes a field indicating a topology of a NB-VPN.

10. In a communication system which implements at least one network based Virtual Private Network (NB-VPN) across a backbone, the at least one NB-VPN using an Open System Interconnect (OSI) layer-2 protocol and an OSI layer-3 protocol, one or more of the at least one NB-VPN using an OSI layer-2 protocol different from an OSI layer-2 protocol used by the backbone or using an OSI layer-3 protocol different from an OSI layer-3 protocol used by the backbone, a method for transmitting an Update message embodied in a transmission medium and comprising a data format, the method comprising:
- transmitting the data format in conformance with a Border Gateway Protocol (BGP), wherein transmitting the data format further comprises transmitting:
  - Virtual Private Network (VPN) Membership information that indicates the identification of at least one VPN to which the Update message relates;
  - a VPN Reachability Mode field that indicates a type of VPN model being used by the at least one VPN;
  - VPN Reachability information that indicates at least one route by which the at least one VPN can be reached; and
  - Tunnel Mechanism information that indicates characteristics of a tunnel used to transport VPN packets across the backbone.

11. The method of claim 10 wherein transmitting the VPN Membership information includes transmitting:
- at least one VPN Identification (VPN-ID) field; and
- a Number of VPN-IDs field.

12. The method of claim 10 wherein transmitting the VPN Reachability information includes transmitting zero or more VPN Reachability Entries.

13. The method of claim 12 wherein transmitting a VPN Reachability Entry includes transmitting:
- a VPN Reachability Type field;
- a Length field; and
- a VPN Reachability Value field.

14. The method of claim 10 wherein transmitting the Tunnel Mechanism information includes transmitting zero or more VPN Tunnel Entries.

15. The method of claim 14 wherein transmitting a VPN Tunnel Entry includes transmitting:
- a Tunnel Type field;
- a Length field; and
- a Tunnel Value field.

16. The method of claim 10 wherein a unique Subsequent Address Family Identifier (SAFI) value is transmitted to indicate that the Update message includes:
- Virtual Private Network (VPN) Membership information;
- VPN Reachability information; and
- Tunnel Mechanism information.

17. The method of claim 16 wherein the unique SAFI value that is transmitted is 129.

18. The method of claim 10 further including transmitting a field indicating a topology of a NB-VPN.

19. A Virtual Router (VR) in a communication system which implements at least one network based Virtual Private Network (NB-VPN) across a backbone, the at least one NB-VPN using an Open System Interconnect (OSI) layer-2 protocol and an OSI layer-3 protocol, one or more of the at least one NB-VPN using an OSI layer-2 protocol different from an OSI layer-2 protocol used by the backbone or using an OSI layer-3 protocol different from an OSI layer-3 protocol used by the backbone, the VR operable to:
- receive an Update message being in conformance with a Border Gateway Protocol (BGP), the Update message further including information relating to a NB-VPN to which the VR belongs and information relating to networking systems used by the NB-VPN to which the VR belongs; and
- the VR including instructions for establishing an OSI layer-2 connection to at least one other VR in the communication system based at least in part on information in the Update message;
- wherein the Update message comprises:
  - Virtual Private Network (VPN) Membership information that indicates an identification of at least one VPN to which the Update message relates;
  - a VPN Reachability Mode field that indicates a type of VPN model being used by the at least one VPN;
  - VPN Reachability information that indicates at least one route by which the at least one VPN can be reached; and
  - Tunnel Mechanism information that indicates characteristics of a tunnel used to transport VPN packets across the backbone.

20. The Virtual Router of claim 19 wherein the Update message includes a unique Subsequent Address Family Identifier (SAFI) value indicating that the Update message includes:
- the Virtual Private Network (VPN) Membership information;
- the VPN Reachability information; and
- the Tunnel Mechanism information.

21. The Virtual Router of claim 20 wherein the unique SAFI value is 129.

22. The BGP Speaker of claim 1, wherein the Update message is for use by BGP speakers receiving the Update message to update routing tables consistent with information included in the Update message; and
- the BGP speaker operable to receive Update messages from other BGP speakers having said VPN Membership information, VPN Reachability Mode field, VPN Reachability information and Tunnel Mechanism information, and updating routing tables accordingly.

* * * * *